Dec. 2, 1969  J. L. DICKMANN ET AL  3,481,228
POWER TONG ASSEMBLY AND CONTROL MEANS THEREFOR
Filed Oct. 17, 1967  9 Sheets-Sheet 1

INVENTORS.
JOHN L. DICKMANN
HOWARD S. FLICK
MELVIN J. PALMER

By C. G. Stallings
ATTORNEY.

Fig. 4.

INVENTORS.
JOHN L. DICKMANN
HOWARD S. FLICK
MELVIN J. PALMER

By C. G. Stallings

ATTORNEY.

Dec. 2, 1969  J. L. DICKMANN ET AL  3,481,228
POWER TONG ASSEMBLY AND CONTROL MEANS THEREFOR
Filed Oct. 17, 1967  9 Sheets-Sheet 6

INVENTORS.
JOHN L. DICKMANN
HOWARD S. FLICK
MELVIN J. PALMER

By C. G. Stallings
ATTORNEY.

Dec. 2, 1969    J. L. DICKMANN ET AL    3,481,228
POWER TONG ASSEMBLY AND CONTROL MEANS THEREFOR
Filed Oct. 17, 1967    9 Sheets-Sheet 8

INVENTORS.
JOHN L. DICKMANN
HOWARD S. FLICK
MELVIN J. PALMER

By C. G. Stallings
ATTORNEY.

United States Patent Office

3,481,228
Patented Dec. 2, 1969

3,481,228
POWER TONG ASSEMBLY AND CONTROL MEANS THEREFOR
John L. Dickmann, Whittier, Howard S. Flick, Long Beach, and Melvin J. Palmer, Huntington Park, Calif., assignors to Byron Jackson Inc., Long Beach, Calif., a corporation of Delaware
Filed Oct. 17, 1967, Ser. No. 675,844
Int. Cl. B25b 17/02
U.S. Cl. 81—57                       14 Claims

ABSTRACT OF THE DISCLOSURE

A power tong assembly in which a pipe gripping mechanism in the tong head is adapted to be driven in opposite pipe gripping and turning directions by a power transmission mechanism including a pair of reversible fluid motors which drive the gripping mechanism at high speed and low torque or low speed and high torque depending upon whether fluid is supplied to one or both of said motors, and control mechanism for the motors including a pair of valves, and valve operating means for the valves including a single lever, operation of the single lever being effective to cause operation of one or both of said motors selectively and in opposite directions.

Cross references to related applications

The present invention involves a valve and valve operating means applicable to the reversible power transmission claimed in the application of John L. Dickmann and Melvin J. Palmer entitled Power Tong Assembly and Transmission Means Therefor, Ser. No. 675,845, filed Oct. 17, 1967 for controlling the operation of the reversible pipe gripping means claimed in the application of John L. Dickmann and Howard S. Flick, entitled Power Tong Head and Assembly Ser. No. 675,843, filed Oct. 17, 1967

BACKGROUND OF THE INVENTION

Field of the invention

The present invention relates to power tongs, or wrenches, of the type generally employed for the purpose of making up or breaking out joints in well pipe or tubing strings or strings of sucker rods, all herein generically called pipe, as the string is run into or retrieved from a well, such as an oil or gas well.

More particularly, the invention involves a control mechanism for valves which effect the operation of a pair of motors which drive a pipe gripping head in opposite directions at high speed and low torque or low speed and high torque depending upon whether one or both of the motors are operating.

In the operation of power tongs for making up and breaking out pipe joints as a pipe string is being run into or pulled from a well, the joints require high break out and make up torque and desirably the pipe should be spun at high speed and relatively low torque during the other stages of making and breaking the joints.

Summary of the invention

Accordingly, an object of the present invention is to provide in and for a tong assembly having a reversible pipe gripping means and a power transmission including first and second reversible fluid motors and separate valve means for controlling the direction of operation of the respective motors, operating means for the valves whereby the valves may be both opened simultaneously to cause operation of the motors in either direction, or one of the valves may be opened to cause one motor to operate in either direction, by the simple manipulation of a single control lever.

Another object of the invention is to provide a valve actuating mechanism for simultaneously moving a pair of valves between a neutral position or either of two open positions, or for moving only one of the valves between said positions, whereby in the case of the reversible tong assembly hereof, the pipe gripping means may be operated to rotate a pipe in either direction and at either high speed and low torque or low speed and high torque, by the simple manipulation of a single lever.

Yet another object of the invention is to provide a valve actuating mechanism for simultaneously moving a pair of valves between a neutral position or either of two open positions, or for moving only one of said valves between said positions, wherein one rock shaft is connected to one valve and another rock shaft is connected to the other valve, and operating means are connected to one of said shafts to move the same from a normal position to two different positions, and said operating means being optionally connectable to the other of said shafts to move both shafts from a normal position to two open positions, said operating means being effective to move both of said shafts simultaneously or separately.

Other objects and advantages of the invention will be hereinafter described or will become apparent to those skilled in the art, and the novel features of the invention will be defined in the appended claims.

BRIEF DESCRIPTION OF THE DRAWINGS

FIG. 4 is a horizontal section taken on the line 4—4 of FIG. 3a;

DESCRIPTION OF THE PREFERRED EMBODIMENTS

Figures 1, 8, 9:
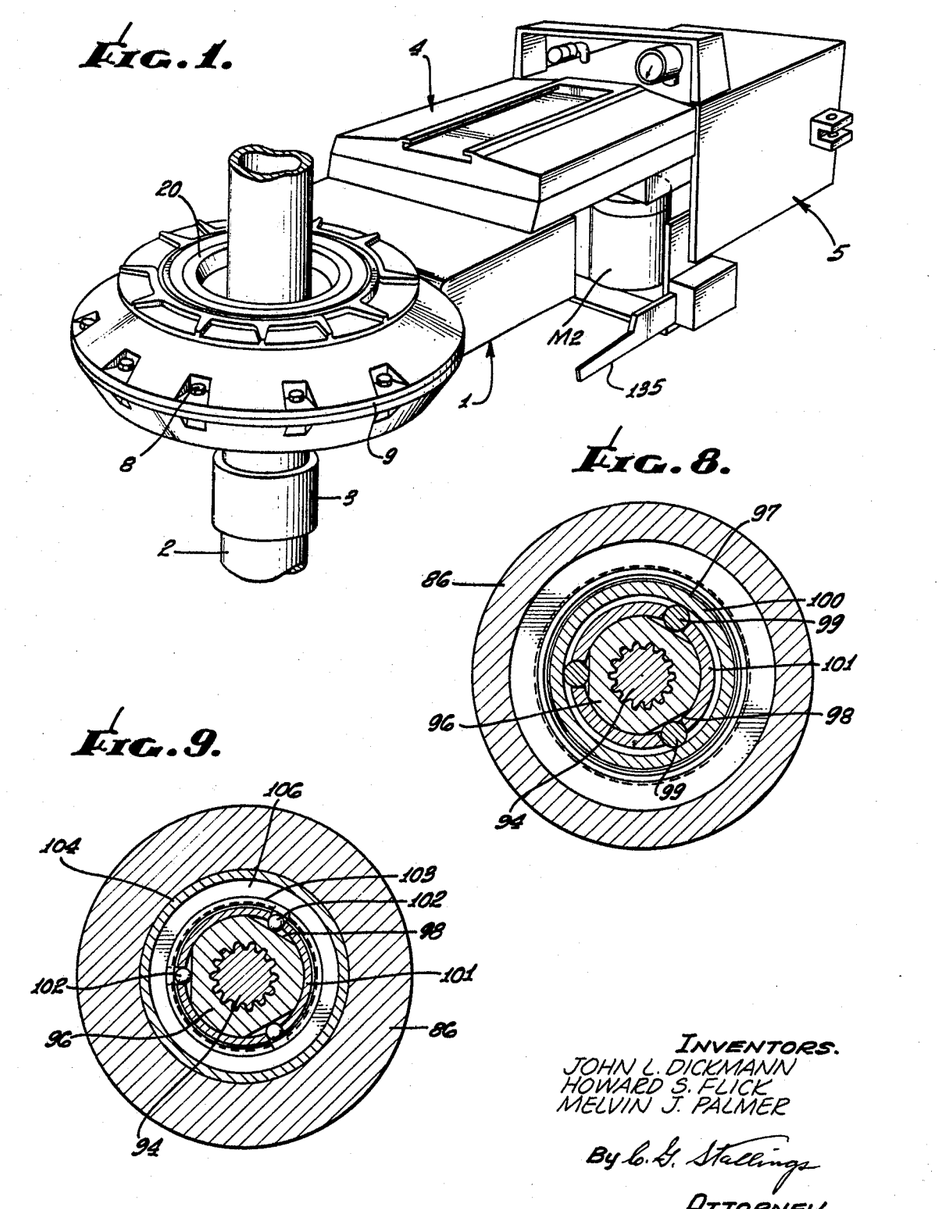
FIG. 1 is a view in perspective illustrating a tong assembly made in accordance with the invention.
FIG. 8 is a horizontal sectional view as taken on the line 8—8 of FIG. 3b.
FIG. 9 is a horizontal sectional view as taken on the line 9—9 of FIG. 3b.
Figure 2:
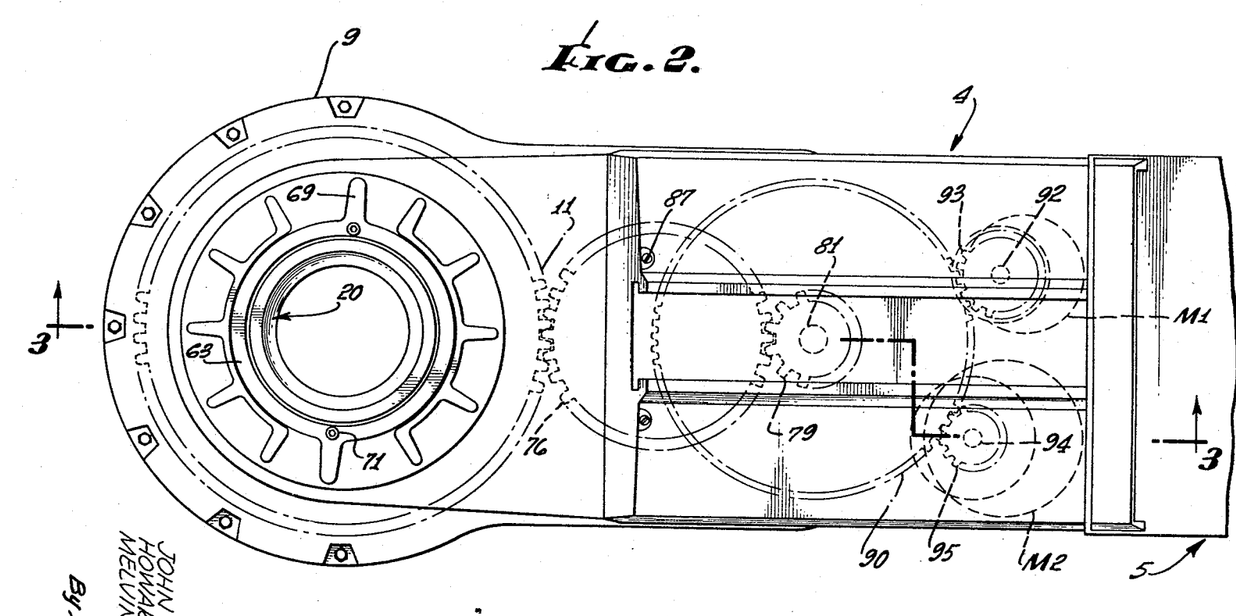
FIG. 2 is a fragmentary top plan view of the assembly of FIG. 1, showing the tong head and transmission subassemblies.

Referring first to FIGS. 1 and 2, a tong assembly embodying the invention will be seen to comprise three separate and distinct subassemblies comprising a pipe gripping or tong head assembly 1 adapted to grip a joint and rotate the same relative to another joint, which joints together compose a threaded connection or joint between stands of well tubing or pipe or sucker rods, all of which are generically referred to herein as pipe, an illustrative length of which is generally illustrated at 2 and includes a joint or coupling 3. Also included in the tong assembly is a power transmission subassembly generally denoted at 4 which contains drive means for effecting rotation of the pipe gripping mechanism included in the tong head. Included in the power transmission subassembly is a plurality of motors, designated M1 and M2 in the illustrative embodiment, these motors, as will hereinafter be more fully described, being adapted to drive the transmission mechanism at a relatively high speed and low torque, on the one hand, and at a relatively low speed and high torque, on the other hand, and in opposite directions. Further, the composite assembly includes a control subassembly generally denoted at 5 whereby an operator of the tong, in the making up and breaking out of pipe or rod joints, will be enabled to cause the motor M2 to operate in either selected direction, while motor M1 remains idle so as to drive the pipe gripping mechanism at a relatively high rate of speed but at low torque, such as would be desirable when a joint is being initially made up and offers little resistance, such relatively high speed initial making up of the joint being generally referred to in the field as "spinning." Thereafter it is desired that the joint be finally made up by the application of relatively high torque forces which the tong operator may accomplish by causing, through the manipulation of the control mechanism 5, the simultaneous operation of motors M1 and M2 in such a manner that the transmission mechanism will impart to the gripping mechanism high torque loads but at low speed, so as to shoulder or finally tighten up the joint. Alternatively, in the breaking out of a joint the gripping mechanism must impose high torque loads on the joint in order to initiate its rotation so that the control mechanism 5 is adapted to enable the reverse rotation of both of the motors M1 and M2 in such a manner as to cause high torque, low speed rotation of the pipe gripping mechanism to initially break out the joint, and, thereafter, the control mechanism may be manipulated to allow the motor M1 to idle as the motor M2 continues to drive the pipe gripping mechanism at a relatively high speed under the reduced torque requirements for spinning the joint out.

Referring now more specifically to the tong head assembly 1, as best illustrated in FIGS. 3a through 7, it will be seen that this subassembly comprises a split case including an upper case section 6 and a lower case section 7 joined on substantially a median plane by suitable fasteners 8; the case defines a generally circular head end 9 which houses a pipe gripping mechanism generally denoted at G; and in a longitudinally extended, substantially rectangular case section 10 there is housed gear mechanism or other suitable drive means, to be hereinafter described, for effecting rotation of the pipe gripping means G.

Figure 3A:
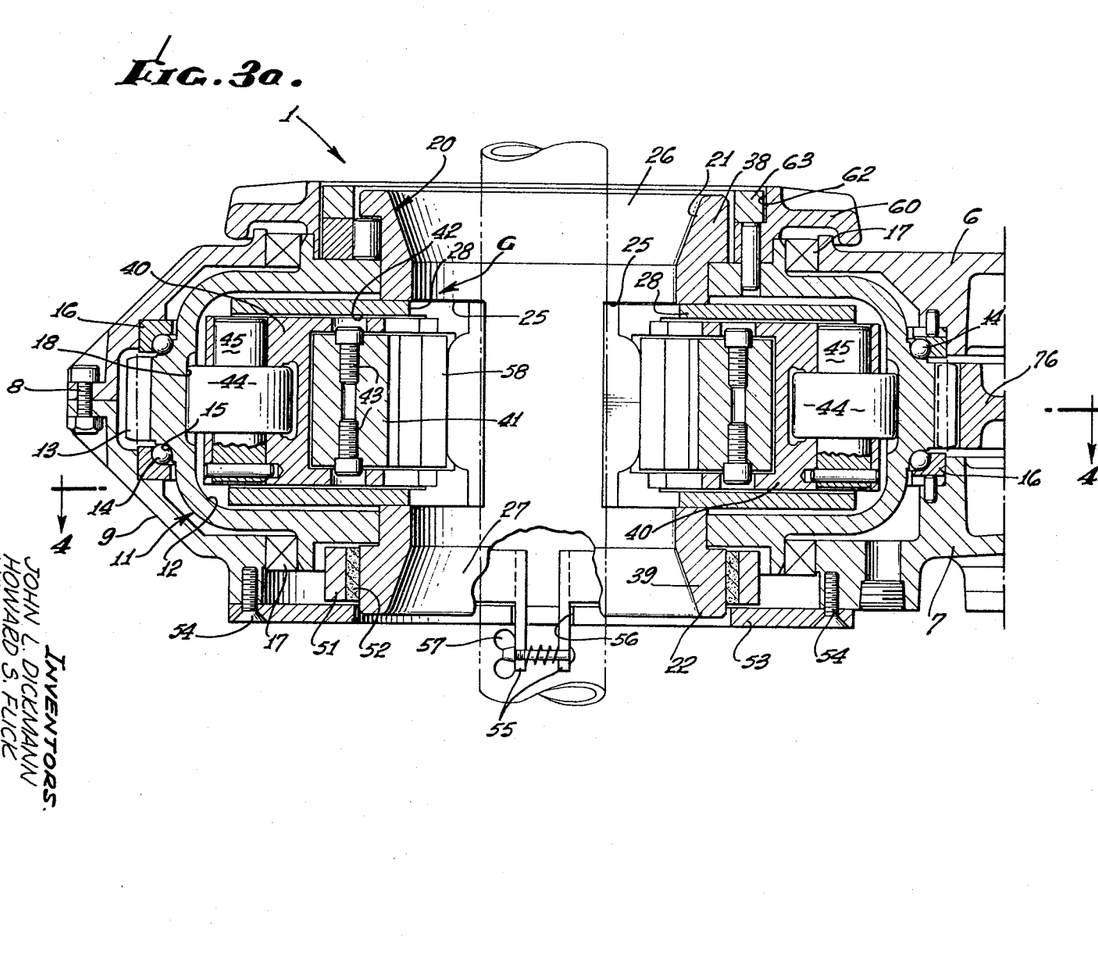
FIG. 3a is a fragmentary longitudinal section through the tong assembly as taken on the line 3—3 of FIG. 2, and showing the tong head.

The pipe gripping means G comprises an outer ring 11 which is of generally U-shape cross-section providing an inwardly opening channel 12. The outer ring 11 is provided about its outer periphery with drive elements in a specifically illustrated form of gear teeth 13, so that the outer ring may be said to constitute a bull gear. Suitable bearing means are provided for supporting the outer ring 11 for revolution within the case section 9, such bearing means being shown as ball bearings 14 engaging in annular races 15 formed about the outer wall of the outer ring 11 and riding in races 16 provided within the case section 9. Suitable seal rings 17 may be provided between the case and a confronting portion of the outer ring 11 to prevent the entry of well fluids or other materials into the case section 9 which might otherwise cause damage to the drive mechanism for the outer ring 11.

Figure 4:
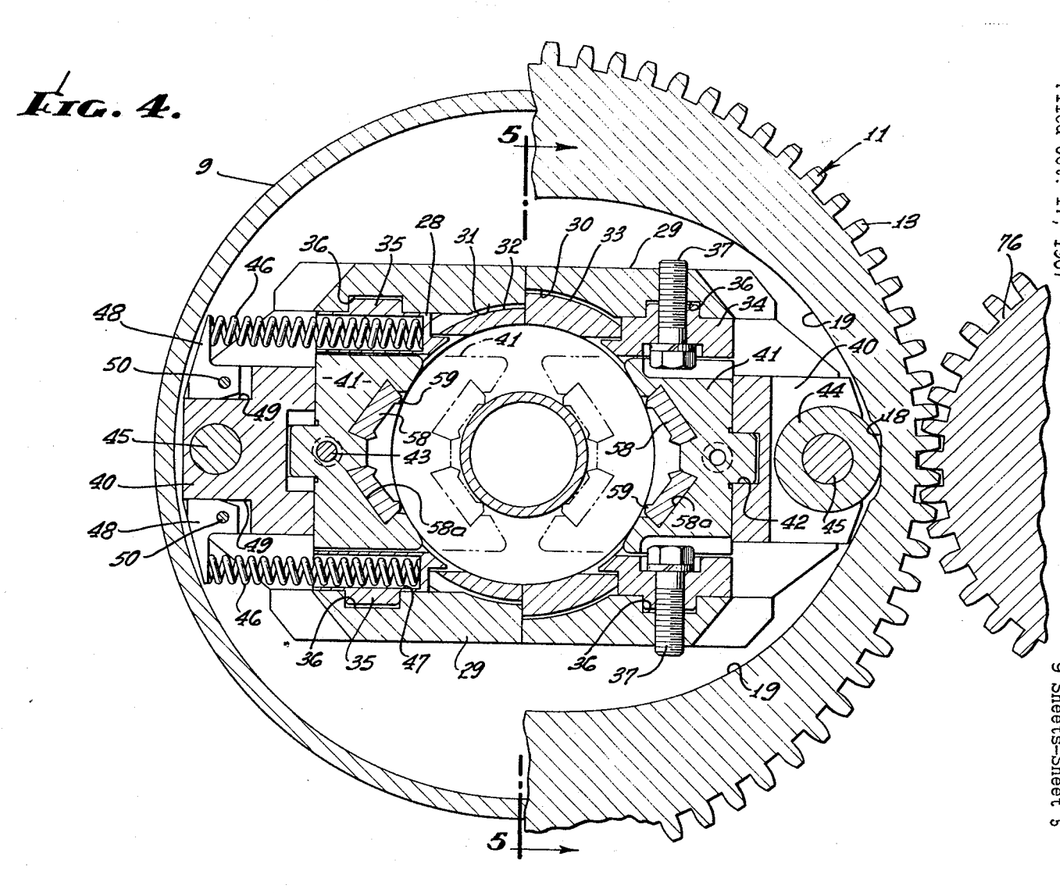

As best seen in FIG. 4, the outer ring 11 is provided with diametrically opposing compound cam sections, each including a central low region 18 and oppositely extending rising surfaces 19, these rising surfaces each being formed on an arc of progressively decreasing radii from said low region, and the rising surfaces of the opposing cam sections, in the illustrative embodiment, meeting one another at a diametrical plane at right angles to a diametrical plane of the outer ring 11 extending through the low regions 18 of the camming sections. This is to say that the portion of the rising cam surfaces 19 adjacent the low region 18 of the cam sections is formed on an arc having a greater radius than an intermediate portion of the rising surfaces, and the intermediate portions of the rising surfaces are struck on an arc of greater radius than the portions of the rising surfaces nearest the end thereof remote from the low region.

Revolvably disposed within the outer ring 11 is what may be typified as the inner ring assembly, generally denoted at 20. Included in the inner ring assembly 20 (see FIGS. 3a, 4 and 5) is a pair of guide members, including an upper tubular guide 21 and a lower tubular guide 22, respectively having diametrically opposed, axially extended arms 23 and 24 which confront one another substantially at the mid plane of the tong head. These arms define therebetween lateral openings 25 of rectangular form and in diametrically opposed relation, these openings leading into the central axially extended opening through the composite guides 21 and 22, this latter central opening constituting an opening through which pipe or rods may be extended as they are being run into or pulled from a well by the usual hoist equipment in the derrick, all as is well known in the art; and in order to facilitate movement of couplings into and through the central opening of the guides, the upper guide 21 has a beveled or flared wall 26, and the lower guide 22 has a beveled or flared wall 27.

Figure 5:
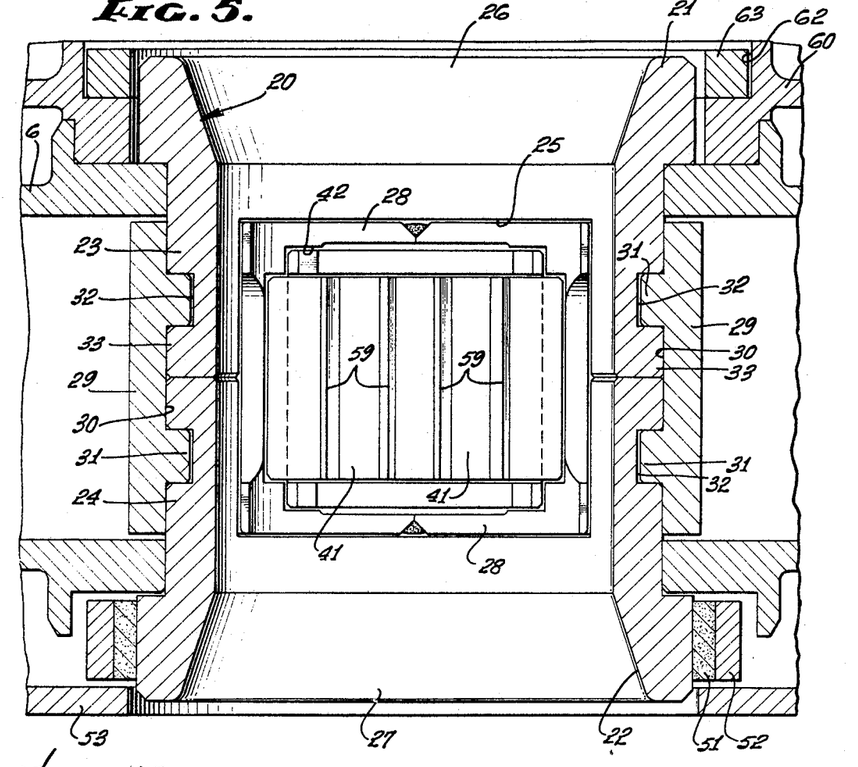
FIG. 5 is a transverse section taken on the line 5—5 of FIG. 4.

Means are provided for joining the guide sections in assembled relation, as well as for supporting in the lateral openings 25 a pair of hollow jaw guides 28, 28. Such means, in the illustrative embodiment, includes a pair of jaw guide clamps or plates 29, 29 which, as best seen in FIGS. 4 and 5, have a series of axially spaced grooves 30 and ribs 31 formed in an arcuate inner mid section of the plates 29 complementally with grooves 32 and ribs 33 formed in the arms 23 and 24 of the respective upper and lower guides 21 and 22. It will be understood that these complemental and co-engaged ribs and grooves not only support the jaw guide clamps or plates 29 on the composite guides, but also that these ribs and grooves hold the composite guide assembly together in the relationship as shown in FIG. 3a.

The jaw guides 28 constitute box-like hollow members having side walls 34 provided with vertically extended external ribs 35 disposed in complemental vertical grooves 36 in the plates 29, suitable fastening means, such as screws 37, extending through the jaw guide walls 34 and into the clamp plates 29 so as to maintain all of the components, including the guides 21 and 22, the clamp plates 29, and the jaw guides 28, in an integrated assembly, with the jaw guides 28 extending radially outwardly into the channel 12 formed in the outer ring 11, as previously described. This integrated assembly, constituting the inner ring 20, is adapted to be supported for rotation relative to the outer ring 11, and, illustratively, it will be noted that the upper guide 21 has an outwardly extended flange 38 which supports the inner ring assembly on the upper outer wall of the outer ring 11, while the corresponding flange 39 of the guide 22 is slightly downwardly spaced from the corresponding lower outer wall of the outer ring 11. Thus, the inner ring 20 is disposed within the outer ring 11 for relative rotation thereof.

The gripping mechanism G further includes a pair of jaws 40, 40 slidably disposed within the jaw guides 28 for radial movement into and out of the central opening through the guides 21 and 22. Included in each of the jaws 40 is a die carrier 41 adapted to be removably retained in a seat 42 as by means of fasteners 43. At the outer end of each of the jaws 40 cam follower means in the form of a roller 44 supported on a vertical shaft 45 are provided in each jaw, these rollers 44 being engageable with the cam sections previously described in the outer ring 11. Means are provided for normally biasing the jaws 40 outwardly to cause engagement of the rollers 44 with the cam sections, and such means (see FIG. 4) may comprise a suitable number of coiled compression springs 46 seated at one end in bores 47 in the side walls 34 of the jaw guides and abutting at their other ends against a foot provided on an L-shaped spring seat 48, a leg of which is disposed in a slot 49 in the jaw 40 and retained therein as by a pin 50.

It will now be apparent that with the structure as thus far described, relative revolution of the outer ring 11 about the inner ring 20 will cause movement of the cam sections relative to the followers 44, so that the latter will be cammed inwardly by one of the rising surfaces 19, depending upon the direction of rotation of the outer ring 11. In order to assure that such relative rotation will occur when the outer ring 11 is driven, brake means are provided for applying a drag to the inner ring 20. Illustratively, such brake means comprises a brake band 51 having friction material 52 thereon and engageable with the outer peripheral surface of the flange 39 of the lower guide 22, the brake band 51 being retained against downward displacement from the flange 39 by means of a bottom plate 53 secured to the case section 7 as by fasteners 54 and extending into underlying relation to the brake band. In order to anchor the brake band against rotation with the inner ring 20, anchor means are provided and, in the illustrative embodiment, such anchor means comprise ears 55 formed on the extremities of the brake band and extending downwardly through a slot 56 in the plate 53. These ears 55 are joined together in a suitable state of tension adjustment about the inner ring flange 39 by means of a suitable adjuster screw 57; and it will be understood that the ears 55 respectively constitute anchoring abutments engageable with the extremities of the slot 56 to anchor the brake band.

In order to grip a joint disposed within the gripping means G when the jaws 40 are moved toward one another responsive to relative rotation between the outer ring 11 and the inner ring 20, the die holders 41, previously referred to as constituting a part of the jaws 40, are provided with suitable die means, including a pair of similar dies 58, each having along vertical edges thereof teeth 59 adapted to bite into the coupling on engagement therewith. These dies 58 are disposed in dovetail slots 58a extending vertically in the die carriers 41 and generally disposed at an angle relative to the diametrical lines extending across the central opening through the guides, so that the dies will engage with one or another of the teeth 59 a substantial range of joint diameters without requiring changing of the dies 58 or the die carriers 41. The vertically toothed dies 58 herein illustrated may be, moreover, replaced by arcuate toothed dies which more particularly are designed to fit with a particular joint diameter, as is well known in the art.

Figures 6, 10:
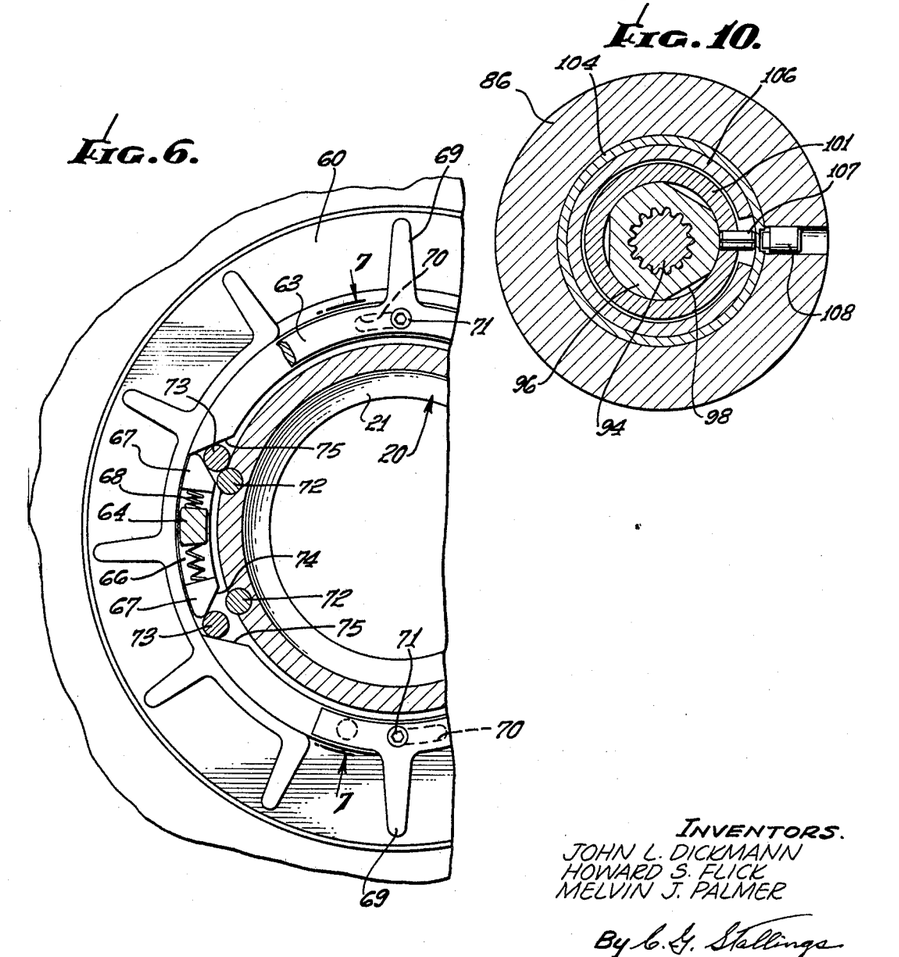
FIG. 6 is a fragmentary view partly in section and partly in plan showing the reverse stop mechanism of the tong head.
FIG. 10 is a horizontal sectional view as taken on the line 10—10 of FIG. 3b.
Figure 7:
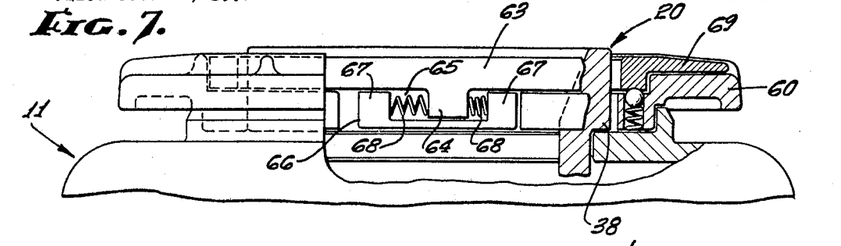
FIG. 7 is a view taken on the line 7—7 of FIG. 6.

Following the gripping and rotation of a joint part by the gripping means G, it is desired that the gripping means be released from the joint part in response to reversal of the direction of rotation of the outer ring 11 to cause return movement of the followers 44 to the low regions 18 of the camming sections within the outer ring. Means are provided to prevent the continued relative rotation between the outer ring 11 and the inner ring 20 to prevent the gripping means from again being actuated into gripping engagement with the joint part as a result of reversal of the rotation. Such means is best illustrated in FIGS. 3a, 6 and 7 wherein it will be noted that a flange 60 is provided in overlying relation to the seal means 17, this flange 60 being secured to the upper wall of the outer ring 11 as by a suitable number of fasteners (not shown). Within the flange 60 there is provided an annular seat 62 in which is rotatably disposed a ring 63. At at least one location about the ring 63 is a downwardly extended lug 64 which extends into an upwardly opening slot 65 in a sliding block 66 having upstanding end lugs 67, 67. Coiled springs 68, 68 are interposed between the opposing end lugs 67 and the intermediate lug 64 of the ring 63, and means are provided for causing rotation of the ring 63 relative to the flange 60, for example, a pair of outwardly extended lever arms 69 projecting outwardly from the ring 63 for manual engagement. The relative angular position of the ring 63 is adapted to be adjusted within the limits of elongated arcuate slots 70 provided in the flange 60, locking screws 71 carried by the ring 63 extending through the slots 70 and into threaded engagement with the outer ring 11. It is now apparent that the outer ring 11, when rotating, carries with it the flange 60 and the ring 63, and, in order to prevent reverse actuation of the gripping means G into engagement with the joint part as aforementioned, stop elements are provided on the guide 21, these stop elements being in the form of rollers 72 mounted in the outer peripheral wall of the flange 38 of guide 21 in angularly spaced relation and selectively engageable by floating rollers 73, one of which is adapted to be cammed inwardly for engagement with one of the rollers 72, depending upon the relative adjusted position of the ring 63. As best seen in FIG. 6, these floating rollers 73 are adapted to be cammed inwardly by wedge surfaces 74 at the opposite ends of the floating block 66, these wedge surfaces 74 being opposed by wedge surfaces 75 formed in the inner periphery of the flange 60. As will now be apparent, the floating block 66 is biased by one of the springs 68, depending upon the position of ring 63, to a position at which the opposing wedge surfaces 74 and 75 will hold one of the rollers 73 in a radially inwardly displaced position for engagement with one of the rollers 72. In FIG. 6 it will be noted that the outer ring assembly is free for counterclockwise rotation relative to the inner ring guide 21, but clockwise rotation will be prevented. Thus, the tong head assembly may be employed to turn a joint part in a counterclockwise direction, but the gripping means G will be prevented from reverse actuation when the outer ring 11 is rotated in the reverse direction, so that the inner ring 20 will be caused to rotate along with the outer ring 11 when the followers 44 are at the low regions 18 of the camming sections.

As seen in FIGS. 1, 2, 3a and 3b, the tong head case sections 6 and 7 extend outwardly from the generally circular head end 9 thereof so as to form the box-like section 10 of the case in which is disposed the illustrative gearing by which the bull gear-like outer ring 11 is to be driven. This gearing includes a large ring gear 76 having a hub 77 journalled in bearings 78 supported between the case sections 6 and 7. The ring gear 76 is in mesh with a pinion 79 which is journalled in bearings 80 mounted in the case sections 6 and 7 and adapted to be driven by a lower splined section 81 of a short splined shaft 82 which extends through an opening 83 in the upper case section 6, and, more particularly, through a horizontally extended wall 6a thereof which constitutes a portion of means, including the wall 6a, for connecting the tong head case to the power transmission mechanism 4 now to be described.

This transmission means or section 4 of the assembly also comprises a longitudinally split case having an upper case section 85 and a lower case section 86 having a wall 86a mating with the wall 6a of head assembly 1 and suitably joined thereto as by fasteners 87, this wall 86a having an opening 88 aligned with opening 83 in head case wall 6a. Journalled in the opening 88 is the hub 89 of a large ring gear 90 constituting the driven gear of the gearing means of the transmission. The short splined shaft 82 previously described has a splined end 91 engaged in the hub 89 so that power is transmitted from the gear 90 to the head gearing 79, 76, 11.

The motors M1 and M2 previously referred to are adapted to drive the ring gear 90, and, accordingly, these motors are mounted beneath a portion of the transmission case which extends rearwardly from the head case. The motor M1 is preferably a hydraulic or other reversible fluid motor having an output shaft 92 on which is a pinion 93 engaged with ring gear 90 within the transmission case, so as to drive the ring gear 90 in opposite directions at a speed dependent upon the gear ratio and the flow of fluid through the motor M1.

Motor M2 is also mounted beneath the transmission case adjacent motor M1 and has an output shaft 94 adapted to drive the ring gear 90 in opposite directions through double acting, self-energizing, overrunning clutch means C interposed between the drive pinion 95 and the motor shaft 94. This clutch means is illustrated in FIGS. 3b and 8–10 as including a power input or drive part 96 splined to the motor shaft 94 and a power output or driven part 97 journalled in the transmission case and integral with, or otherwise made a part of, the pinion 95.

More particularly, this overrunning clutch means includes camming surfaces 98 arranged in equidistantly spaced relation about the drive part 96 and engageable with a like number of rollers 99 to urge the latter outwardly into driving relation with the inner periphery of a wall 100 formed as a part of the driven clutch part 97 (see FIG. 8). These rollers 99 are supported in a carrier ring 101 which also supports a plurality of equidistantly spaced additional rollers or balls 102 engaged with the camming surfaces 98. These balls 102 are normally biased inwardly into engagement with the camming surfaces 98 by a resilient spring ring 103 disposed about the balls; and this spring ring functions to normally tend to centralize the balls 102 with respect to the camming surfaces 98, thereby also centralizing the rollers 99 with respect to the surfaces 98. Fixed drag brake means are provided so that when the drive part 96 is rotated in either direction relative to the driven part 97, the clutch will be engaged. This brake means comprises a cup-like brake drum 104 supported within the case section 86 between a pair of snap rings 105. Within the brake drum 104 is a discontinuous drag ring 106, the ends of which are spaced apart (see FIG. 10). The roller carrier 101 has an outward projection or abutment 107 extending into the space between the ends of the drag ring 106. When the drive part 96 is rotated, the camming surfaces 98 will force the balls 102 outwardly from their centralizing position transmitting the rotation to the roller carrier 101 until the pin 107, just referred to, engages one of the drag ring ends, depending upon the direction of rotation, whereupon further rotation of the roller carrier 101 will be resisted by frictional engagement of the drag ring 106 in the brake drum 104, and thus the rollers 99 will be forceably cammed outwardly into engagement with the wall 100 of the driven part 97. Rotation of the brake drum 104 along with the drag ring 106 is prevented by provision of a suitable stop, such as a pin 108, engaging the drum 104 and fixed in the case 86.

From the foregoing, it will now be understood that in operation the motor M1 may drive the ring gear 90 in either direction and, unless the motor M2 is also operating to drive the clutch drive part 96, the clutch driven part 97 will idle along with the ring gear 90; however, when the motor M2 is operated to cause rotation of the clutch drive part 96, then both of the motors will be effective to drive the ring gear 90 in either direction, such selective operation of the motors M1 and M2 is adapted to be controlled by control means for the flow of fluid to the respective motors from a source, as will now be described.

Figure 11:
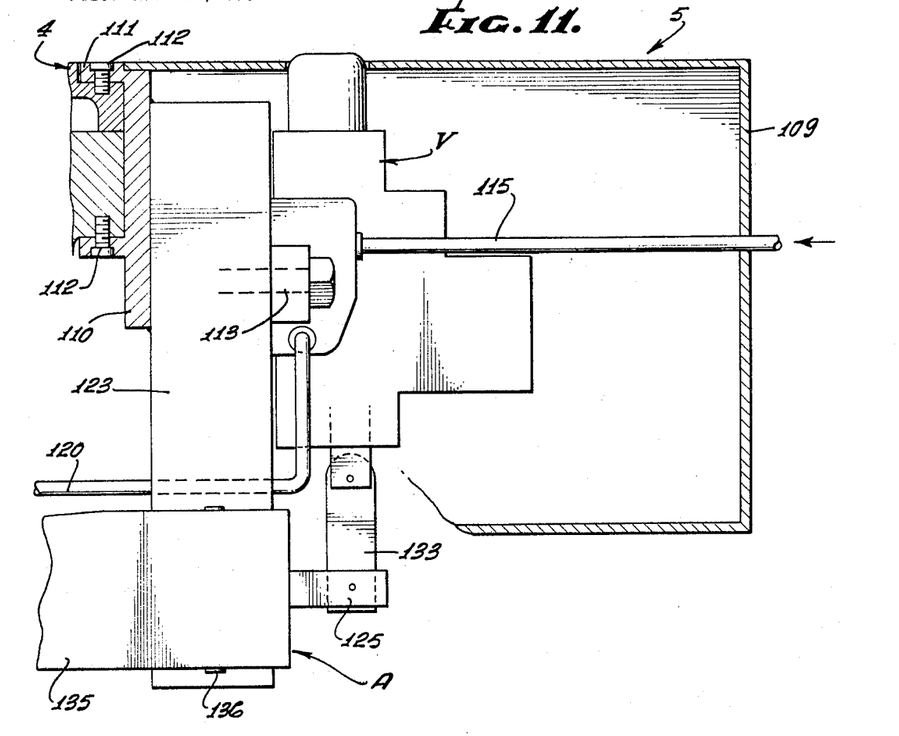
FIG. 11 is a fragmentary view in side elevation showing the manifold and control means for the motors, the case being broken away.
Figure 12:
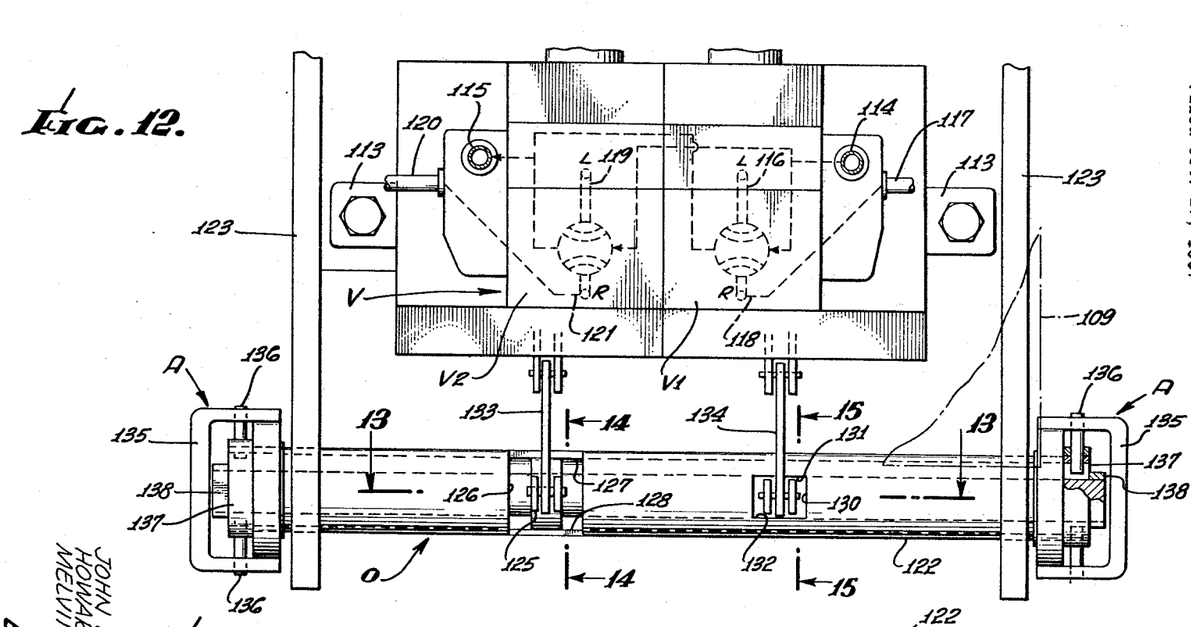
FIG. 12 is a view in rear end elevation of the structure of FIG. 11.

The control section 5 of the tong assembly, as generally illustrated in FIG. 1, includes a cover or case 109 which, as seen in FIG. 11, is adapted to be connected to the rear end of the transmission subassembly 4 on a supporting bracket 110 having ears 111 secured by fasteners 112 to the transmission case. Within the cover 109 and supported on the bracket 110, as at 113, is a fluid manifold and valve assembly generally denoted at V, whereby to control the flow of power fluid from a source (not shown) to the respective motors M1 and M2. Schematically illustrated in the valve and manifold assembly V, as seen in FIG. 12, is a first valve means V1 and a second valve means V2, respectively adapted to control the flow of motor fluid to the motors M1 and M2 under the influence of operating means generally denoted at 0, which operating means is operable by actuator means generally denoted at A. Accordingy, valve V1 is adapted to control the flow of fluid from the source leading into the manifold at an inlet 114 and leading from the manifold at an outlet 115 from the motor M1 in such a manner that fluid will flow from the inlet 114 through a valve passage 116 to motor M1 and from that motor through a conduit 117 and a valve passage 118 through the valve and to the outlet 115, so as to drive the motor M1, say in a left-hand direction, when the valve is in a first position. The valve V1 is operable when it is in a second position to cause a reversal of the direction of flow so that the motor M1 will be driven in the opposite or right-hand direction. Likewise, the valve V2 is adapted to control the flow of fluid through the motor M2 in reverse directions by causing the flow of fluid from the inlet 114 through a valve passage 119 and from the motor through a conduit 120 and thence a valve passage 121, whereby the motor M2 will rotate in a left-hand direction; and, when the valve V2 is adjusted to a second position, the flow of fluid will be reversed, causing the operation of the motor in a right-hand direction. It will be understood that the arrangement of the valves and the flow passages is merely illustrative and that any desired four-way valves or other valve means may be employed to accomplish the reversal of fluid flow through the two motors, but it is preferred that the operating means O be so constructed as to move the valve V1 to its first position or to its second position while the valve V2 remains closed, but, when it is desired, the valve V2 may be moved either simultaneously with, or after movement of, the valve V1 to its first and second positions.

Figure 13:
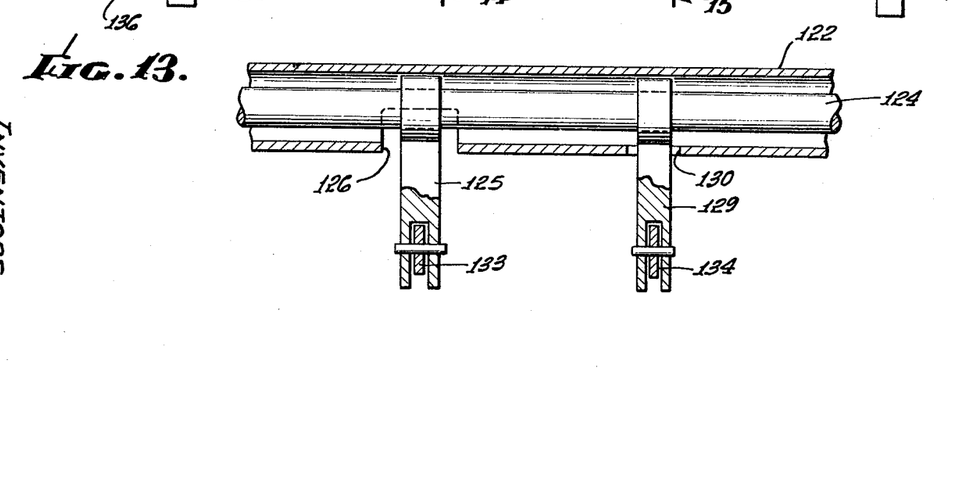
FIG. 13 is a view in section as taken on the line 13—13 of FIG. 12, showing the compound control rock shaft assembly.
Figure 14:
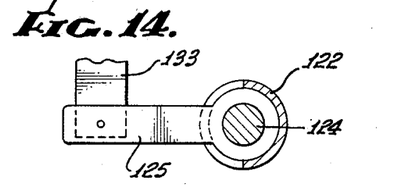
FIG. 14 is a view in section on the line 14—14 of FIG. 12.
Figure 15:
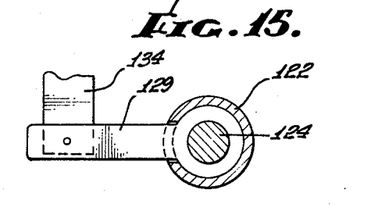
FIG. 15 is a view in section on the line 15—15 of FIG. 12.

This operating means comprises a rock shaft 122 rotatably mounted in transversely extended relation by a pair of arms 123 depending from the bracket 110. The rock shaft 122 is a hollow shaft within which is revolvably disposed a second rock shaft 124. As seen in FIGS. 13 and 14, the inner rock shaft 124 has a lever arm 125 connected thereto and extending laterally through an opening 126 in the hollow rock shaft 122, this opening 126 being extended angularly so as to provide clearance space between end walls 127 and 128 thereof. As seen in FIGS. 13 and 15, the inner rock shaft 124 also has a lever arm 129 projecting therefrom and through an opening 130 providing angularly spaced abutments 131 and 132 engageable with the lever arm in a manner hereinafter to be described. Carried by the lever arm 125 is a valve operating linkage means 133 adapted to be connected to the valve V1 so as to move the latter between its first and second positions from its off position; and connected to the lever arm 129 is linkage means 134 adapted to be connected to the valve V2 to cause its operation between its first and second positions from its off position.

Figures 3B, 17:
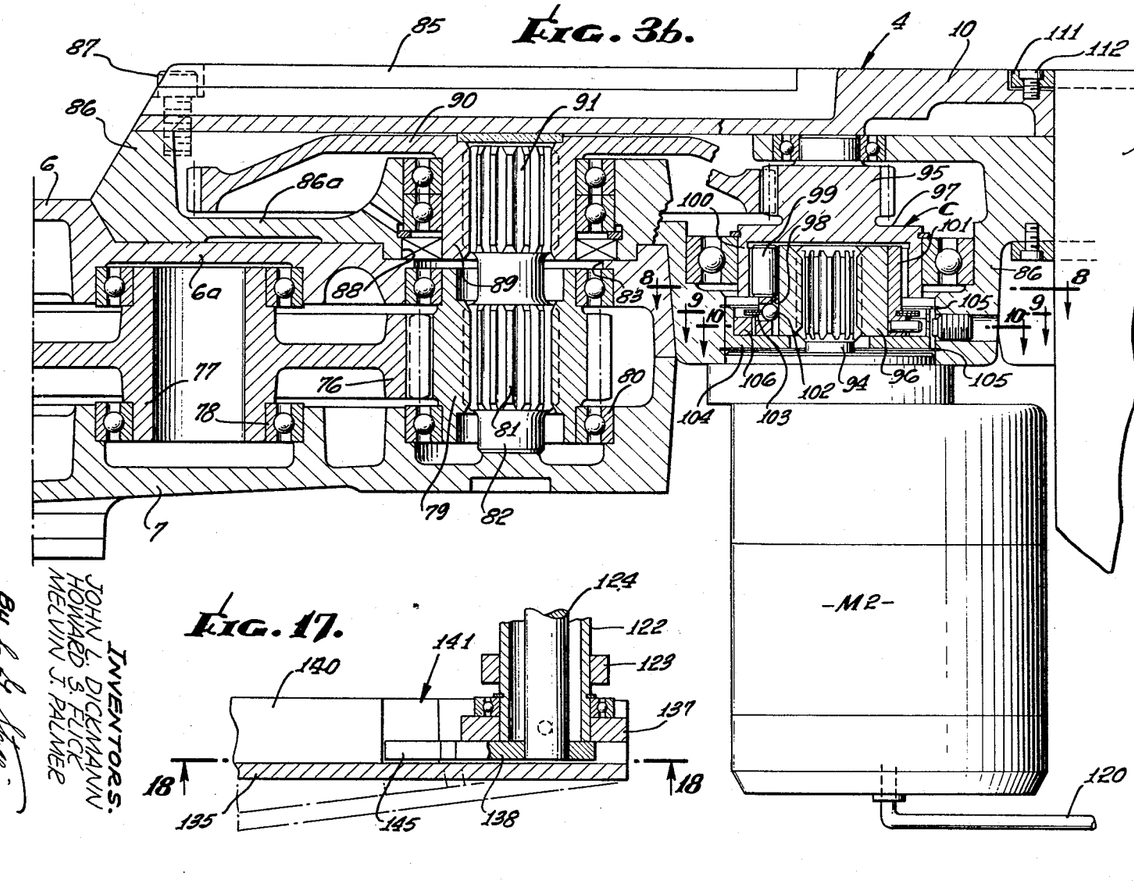
FIG. 3b is a continuation of FIG. 3a, showing the power transmission.
FIG. 17 is a fragmentary view in section as taken on the line 17—17 of FIG. 16.
Figure 16:
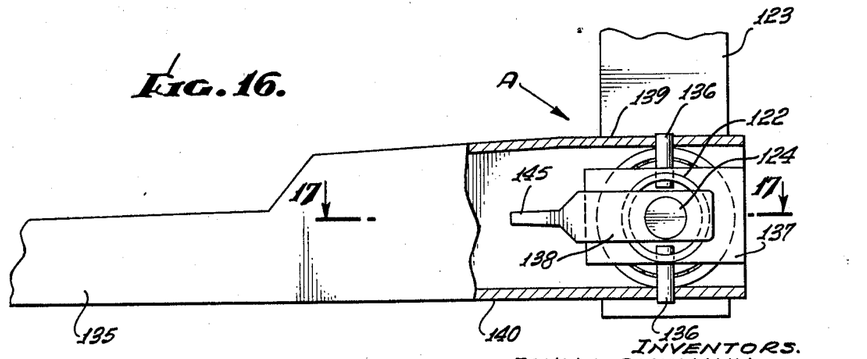
FIG. 16 is a fragmentary view in side elevation showing the connection of the actuator lever to the operating means for the motor control valves.
Figure 18:
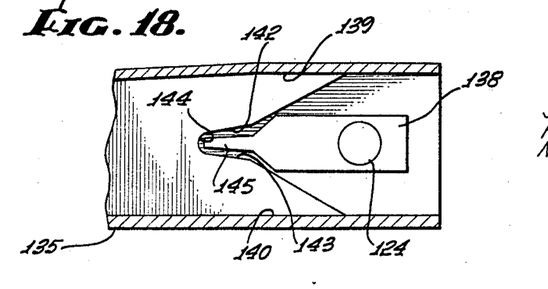
FIG. 18 is a fragmentary view in section as taken on the line 18—18 of FIG. 17.

The actuating means A for the operating means O, just described, is located at one end of the rock shafts 122 and 124, but preferably at each end of said rock shafts, so as to enable operation of the tong assembly from either side thereof. As best seen in FIGS. 12, 16 and 17, the actuator means comprises a lever 135, the lever being pivotally supported on pins 136 which are carried by a member 137 which is connected to the hollow rock shaft 122, the pins 136 extending into the hollow rock shaft so as to effect rotation of the latter when the lever 135 is moved between a normal position in either direction. The rock shaft 124 extends endwise from the hollow shaft 122 and has secured to its outer end a lever 138 having an arm extending lengthwise of the lever 135 between upper and lower walls 139 and 140 of the lever 135. Between these walls 139 and 140 are camming means generally denoted at 141 and including an upper wedge surface 142 and a lower wedge surface 143 defining therebetween a central slot 144. These wedge surfaces and slot are adapted to cooperate with an end 145 on the actuator lever 138 only when the lever 135 is pivoted to a laterally displaced outer position as shown in broken lines in FIG. 17, so that when the lever 135 is in its normal position, shown in full lines in FIG. 17, and is moved either upwardly or downwardly, it will effect corresponding rotative movement of the hollow rock shaft 122; but when the lever 135 is pivoted about pins 136 to the angular position shown in broken lines in FIG. 17, the end 145 of lever 138 will be engaged in the slot 144 within lever 135 so that the two levers will move simultaneously, thereby effecting simultaneous rocking movement of the hollow rock shaft 122 and the internal rock shaft 124. Thus it will be understood that the actuator lever 135 is effective to cause either movement of the outer rock shaft 122 alone, or together with the inner rock shaft 124, in opposite directions so as to effect either the operation of valve V2 upon abutment of either of the abutments 131 and 132 with the lever 129 or the simultaneous actuation of valve V1.

In addition, it will also be noted that when the outer rock shaft 122 is rotated in either direction so as to effect operation of valve V1, the spaced end walls 127 and 128 of the opening 126, through which the operating lever 125 for valve V2 projects, will allow the rock shaft 122 to move to a first position without operating valve V2. Thereafter, depending upon the direction of movement of the actuator lever 135, one of the end walls 127 or 128 just referred to will engage the valve operating lever 125 to cause it to move in a corresponding direction so as to operate the valve V2 when the actuator lever 135 is in a second position. Thus, by the simple manipulation of the actuator lever 135, the tong may be driven at a high speed and low torque through the operation of the valve V1 upon movement of the lever 135 to a first position; upon movement of the lever 135 in the same direction to a second position, the valve V2 will be operated to cause operation of motor M1 which, through the clutch means previously described, will now work with motor M2 so that the tong will be driven at a lower speed and higher torque, as would be desirable when making up a joint. However, when breaking out a joint, and it is desired that the tong be first operated at low speed and high torque, the actuator lever 135 may be pivoted about pins 136 to effect co-engagement of the lever 138 in the slot 144 of the actuator lever 135 so that, when the lever is pivoted to actuate the valve mechanism, both valves V1 and V2 will be initially opened. To initiate operation of the tong, and when the joint has been broken out, the lever 135 may be moved inwardly to the full line position of FIG. 17 so that the valve V2 will close, thereby allowing the tong to operate at high speed and low torque to spin out the joint.

While the specific details of an illustrative embodiment of the invention have been herein shown and described, changes and alterations may be made without departing from the spirit of the invention.

We claim:

1. In a power tong assembly for making up and breaking out joints of pipe, rod, or the like, and comprising a frame structure, pipe gripping means carried by said frame and operable to grip and rotate a threaded joint part relative to another threaded joint part, whereby to make up and break out a joint composed of said joint parts upon rotation of said gripping means in opposite directions, power transmission means for rotating said gripping means in opposite directions, said transmission means including a plurality of motors, one of said motors being adapted to drive said gripping means at high speed and low torque and more than one of said motors operating together being adapted to drive said gripping means at low speed and high torque, and control means for selectively operating said one of said motors alone and in unison with more than said one of said motors, the improvement wherein said control means includes control means for each of said motors, operator means cooperative with the control means of the respective motors, and actuator means for causing operation of the operator means for said one of said motors individually and in unison with more than said one of said motors, said actuator means comprising a single actuator member shiftable to different positions and cooperative with said operator means for the respective motors in said different positions.

2. A power tong assembly as defined in claim 1, wherein said operator means includes a first operator member connected to the control means of said one of said motors, a second operator member connected to the control means of another of said motors, and said actuator means including means for selectively connecting said actuator member to said second operator member.

3. A power tong assembly as defined in claim 2, wherein said actuator member includes first and second abutments, means shiftably mounting said actuator member for movement between a first position at which said first abutment engages said first operator member and a second position at which said second abutment engages said second operator member while said first abutment remains in engagement with said first operator member.

4. A power tong assembly as defined in claim 1, wherein said operator means includes a first rock shaft connected to the control means for said one of said motors and another rock shaft connected to the control means for another of said motors, and said actuator means includes an actuator member movable between a first position at which said actuator member is engaged only with one of said rock shafts and a second position at which said actuator member is engaged with both of said rock shafts.

5. A power tong assembly as defined in claim 1, wherein said operator means includes a first rock shaft connected to the control means for said one of said motors and another rock shaft connected to the control means for another of said motors, and said actuator means includes an actuator member movable between a first position at which said actuator member is engaged only with one of said rock shafts and a second position at which said actuator member is engaged with both of said rock shafts, and said control means being operable to cause operation of said motors in opposite directions upon movement of said rock shafts in opposite directions.

6. A power tong assembly as defined in claim 1, wherein said operator means includes a first rock shaft connected to the control means for said one of said motors, said actuator means comprising a lever shiftable between first and second positions on said first rock shaft and when in said first position with said first rock shaft, from an intermediate position to third and fourth positions for causing movement of said control means for said one of said motors between an off position and positions at which said one of said motors will operate in opposite directions, a second rock shaft connected to the control means for another of said motors, means on said lever and on said second rock shaft coengageable when said lever is in said second position to move said second rock shaft with said first rock shaft for causing movement of said control means for said another of said motors between an off position and positions at which said another of said motors will also operate in opposite directions.

7. A power tong assembly as defined in claim 6, wherein said coengageable means on said lever and on said second rock shaft includes means for moving said control means for said another motor to one of said positions at which said another motor operates in opposite directions when said lever is moved to said second position while in either said third or fourth position.

8. A power tong assembly as defined in claim 6, wherein said coengageable means on said lever and on said second rock shaft includes cam means for moving said control means for said another motor to one of said positions at which said another motor operates in opposite directions when said lever is moved to said second position while in either said third or fourth position.

9. A power tong assembly as defined in claim 6, wherein one of said rock shafts is a hollow shaft and the other of said rock shafts is disposed within said hollow shaft.

10. A power tong assembly as defined in claim 6, wherein said first rock shaft is a hollow shaft and said second rock shaft is disposed within the hollow shaft.

11. A power tong assembly as defined in claim 6, wherein said rock shafts extend transversely of said assembly and said lever is at one side of said assembly, and including a second lever at the other side of said assembly also connected to said first rock shaft, and said second lever and said second rock shaft also having means coengageable when said second lever is in a second position to move said second rock shaft with said first rock shaft.

12. A power tong assembly as defined in claim 1, wherein each of said motors is a fluid motor, and said control means for each of said motors includes valve means for reversing the direction of fluid flow through said motors.

13. A power tong assembly comprising, a head having gripping means therein operable upon revolution thereof to grip and turn a joint part relative to a complemental joint part, means for driving said gripping means including power transmission means and first and second fluid motors for driving said transmission means at high speed and low torque when one motor is operating and at low speed high torque when both of said motors are operating, and means for controlling the operation of said motors comprising a single actuator lever, control valve means for the respective motors, and operator means connecting said lever to said respective valve means for operating one of said motors when said lever is moved from an off position to a second position and for operating both of said motors when said lever is moved to a third position.

14. A tong assembly as defined in claim 13, wherein said operator means includes means for operating said second motor when said lever is moved directly from said second position to said third position.

References Cited

UNITED STATES PATENTS

| | | | |
|---|---|---|---|
| 1,700,291 | 1/1929 | Johnston | 173—164 |
| 2,639,894 | 5/1953 | Smith. | |
| 2,720,803 | 10/1955 | Rice. | |
| 2,780,950 | 2/1957 | Province. | |
| 2,878,026 | 3/1959 | Pioch | 29—240 X |
| 2,923,192 | 2/1960 | Montgomery. | |
| 3,165,325 | 1/1965 | Goepfrich | 173—163 X |
| 3,241,864 | 3/1966 | Shaffer | 166—85 X |
| 3,272,266 | 9/1966 | Kennard | 173—164 |
| 3,380,323 | 4/1968 | Campbell. | |
| 3,382,559 | 5/1968 | Kopec | 29—240 |

FOREIGN PATENTS 662,261  4/1963  Canada.

WAYNE A. MORSE, Jr., Primary Examiner

U.S. Cl. X.R.

29—237, 240, 243; 269—23; 279—4